(12) United States Patent
Maeda

(10) Patent No.: US 6,512,510 B1
(45) Date of Patent: Jan. 28, 2003

(54) KEYBOARD DEVICE WITH POINTING DEVICE USING STRAIN GAUGES INCORPORATED THEREIN

(75) Inventor: Ryoichi Maeda, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/487,378

(22) Filed: Jan. 18, 2000

(30) Foreign Application Priority Data

Jan. 18, 1999 (JP) .......................................... 11-009639

(51) Int. Cl.⁷ ............................................... G09G 5/08
(52) U.S. Cl. ...................... 345/168; 345/161; 345/160
(58) Field of Search ................................ 345/168, 161

(56) References Cited

U.S. PATENT DOCUMENTS

| | | | | |
|---|---|---|---|---|
| 5,159,159 A | * | 10/1992 | Asher ...................... | 178/18.05 |
| 5,325,081 A | * | 6/1994 | Roberts ..................... | 338/2 |
| 5,489,900 A | * | 2/1996 | Cali et al. ................... | 341/34 |
| 5,515,040 A | * | 5/1996 | Lee et al. .............. | 340/870.04 |
| 5,579,033 A | | 11/1996 | Rutledge et al. | |
| 5,659,334 A | * | 8/1997 | Yaniger et al. ............. | 345/156 |
| 5,708,562 A | | 1/1998 | Agata et al. | |
| 6,002,388 A | * | 12/1999 | Seffernick et al. .......... | 345/161 |
| 6,040,823 A | * | 3/2000 | Seffernick et al. ............ | 341/34 |
| 6,445,382 B1 | * | 9/2002 | Poole et al. ................ | 345/160 |

FOREIGN PATENT DOCUMENTS

| | | |
|---|---|---|
| JP | 7-244559 | 9/1995 |
| JP | 7-287636 | 10/1995 |

* cited by examiner

Primary Examiner—Steven Saras
Assistant Examiner—William C. Spencer
(74) Attorney, Agent, or Firm—Brinks Hofer Gilson & Lione

(57) ABSTRACT

In a keyboard device of the present invention, a leader portion formed integrally with a film substrate is provided with switch terminal portions and pointing device terminal portions, and the film substrates are provided with lead-out conductors to be led out to the pointing device terminal portions. A flexible substrate is provided with connection conductors. The connection conductors are connected to lead-out conductors adjacent to the pointing device.

1 Claim, 5 Drawing Sheets

KEYBOARD DEVICE WITH POINTING DEVICE USING STRAIN GAUGES INCORPORATED THEREIN

This application claims benefit to Japanese application no. 11-009639, filed Jan. 18 1999.

BACKGROUND OF THE INVENTION

1. Field of the Invention

The present invention relates to a keyboard device for use in computers and the like, which has a pointing device using strain gauges incorporated therein.

2. Description of the Related Art

A conventional keyboard device will be described with reference to FIGS. 4 and 5. The conventional keyboard device comprises a membrane switch S2, a pointing device P2 incorporated in the membrane switch S2, and a mounting plate T2 made of metal for mounting and supporting the membrane switch S2 and the pointing device P2.

The pointing device P2 comprises, as shown in FIG. 5, a mounting member 21 formed of a metal plate, a control member 22 made of synthetic resin, mounted on the mounting member 21, and having an operating portion 22a and a plurality of strain gauges (not shown), a long flexible substrate 23 attached to the control member 22 at one end and made of polyester resin, and connection conductors 24 formed on the flexible substrate 23 so as to electrically connect the strain gauges to the outside.

The flexible substrate 23 includes a base portion 23a a long extension 23b. The base portion 23a is provided with connection conductors 24 to be connected to the strain gauges in the control member 22, and the extension 23b is provided with connection conductors 24 for leading the above connection conductors 24 connected to the strain gauges to the end of the extension 23b. A resist 25 made of an insulating material is applied to the surface of the flexible substrate 23 so as to cover and insulate the connection conductors 24, excluding the connection conductors 24 at the end of the extension 23b.

In the operation of such a pointing device P2, the operating portion 22a of the control member 22 is tilted in the X1- or X2 direction to change the resistances of the strain gauges, thereby controlling the horizontal movement of a cursor. Furthermore, the operating portion 22a is tilted in the Y1- or Y2-direction to change the resistances of the strain gauges, thereby controlling the vertical movement of the cursor.

That is, the changes in resistance of the strain gauges are detected as changes in voltage, and a computer reads the voltage changes and controls the cursor so that the cursor moves horizontally or vertically in response to the movement of the operating portion 22a in the X1- and X2-directions, or in the Y1- and Y2-directions.

The membranes switch S2 is formed of a polyester resin and includes a rectangular lower film substrate 26, a rectangular upper film substrate 27 placed at a predetermined distance from the lower film substrate 26 with a spacer (not shown) therebetween, and a rectangular leader portion 28 formed integrally with the lower film substrate 26 and protruding therefrom.

A plurality of contact portions (not shown) and a layout conductor (not shown) connected to the contact portions are formed on the opposing surfaces of the lower and upper film substrates 26 and 27. The layout conductor is connected to membrane switch terminal portions 29 formed on the leader portion 28.

When a pressure portion 27a of the upper film substrate 27 is pressed, the upper film substrate 27 is bent, and a contact portion thereof contacts a corresponding contact portion of the lower film substrate 26, whereby a signal is led out to the membrane switch terminal portions 29 via the layout conductor.

The lower and upper film substrates 26 and 27 have holes 26b and 27b for holding the pointing device P2 therein. The leader portion 28 has two cut portions 28a.

The pointing device P2 is placed inside the holes 26a and 27a so that the extension 23b of the flexible substrate 23 is disposed in no contact with the contact portions between the lower film substrate 26 and the upper film substrate 27 without hindrance (shown by a two-dot chain line in FIG. 4). Moreover, the end of the extension 23b is drawn out through the two cut portions 28a so as to support the extension 23b, and the connection conductors 24 and the membrane switch terminal portions 29 are arranged in parallel.

The membrane switch S2 and the pointing device P2 thus combined are fixed on the mounting plate T2 by an appropriate means, such as caulking or bonding, thereby constructing the keyboard device.

The membrane switch terminal portions 29 and the connection conductors 24 in such a keyboard device are connected to an electronic device, such as a computer, and signals from the membranes switch S2 and the pointing device P2 are input to the electronic device.

The conventional keyboard device requires the long flexible substrate 23 to lead out signals from the pointing device P2 to the position of the membrane switch terminal portions 29, which raises material cost.

Since the long flexible substrate 23 also has a complicated shape in order to avoid the contact portions, the process of preparing the material is not simple, which further raises the costs.

The extension 23b of the flexible substrate 23 needs to be passed through and drawn out of the cut portions 28a of the leader portion 28 for the purpose of mounting and support, which impairs assembly work efficiency and raises the costs.

SUMMARY OF THE INVENTION

In view of the above problems, an object of the present invention is to provide a keyboard device that achieves a low material cost and a simple process of preparing the material.

In order to achieve the above object, according to an aspect of the present invention, there is provided a keyboard device including: a membrane switch having two upper and lower film substrates with a plurality of contact portions 14a, and a leader portion formed integrally with the film substrates; and a pointing device incorporated in the area of the membrane switch and having a strain gauge and a flexible substrate for electrically connecting the strain gauge to the outside, wherein the leader portion is provided with a switch terminal portion and a pointing device terminal portion, the film substrates are provided with a lead-out conductor to be led out to the pointing device terminal portion, the flexible substrate is provided with a connection conductor, and the connection conductor is connected to the lead-out conductor adjacent to the pointing device.

This makes it possible to make the flexible substrate substantially shorter than before, and to thereby provide a low-cost keyboard device that achieves a low material cost and a simple process of preparing the material.

Furthermore, there is no need to pass the flexible substrate through the cut portions of the leader portion, as is different from the conventional art. Therefore, it is possible to provide a low-cost keyboard device that achieves high productivity.

Preferably, the flexible substrate includes a base portion on which the strain gauge is disposed, and an extension formed integrally with the base portion and having the connection conductor from the strain gauge formed thereon.

In this case, it is easy to connect and construct the strain gauge and the connection conductor, and to thereby provide a keyboard device that achieves high productivity.

Preferably, the pointing device includes a control member attached to the base portion of the flexible substrate and for operating the strain gauge, and a mounting member formed of a metal plate for mounting the control member thereon. The connection conductor is connected to the lead-out conductor within the surface area of the control member or the mounting member.

In this case, it is possible to establish a substantially short length of connection between the pointing device and the membrane switch, and to thereby provide a low-cost keyboard device that achieves high productivity.

Preferably, the film substrates are made of polyester resin, and the flexible substrate is made of polyimide resin.

Since the strain gauge is formed on the flexible substrate of polyimide resin having high resistance to heat, changes in resistance are accurate in the pointing device. Moreover, since the members are small, it is possible to provide a low-cost input device.

Further objects, features, and advantages of the present invention will be apparent from the following description of the preferred embodiments with reference to the attached drawings.

DESCRIPTION OF THE PREFERRED EMBODIMENTS

Figure 1:
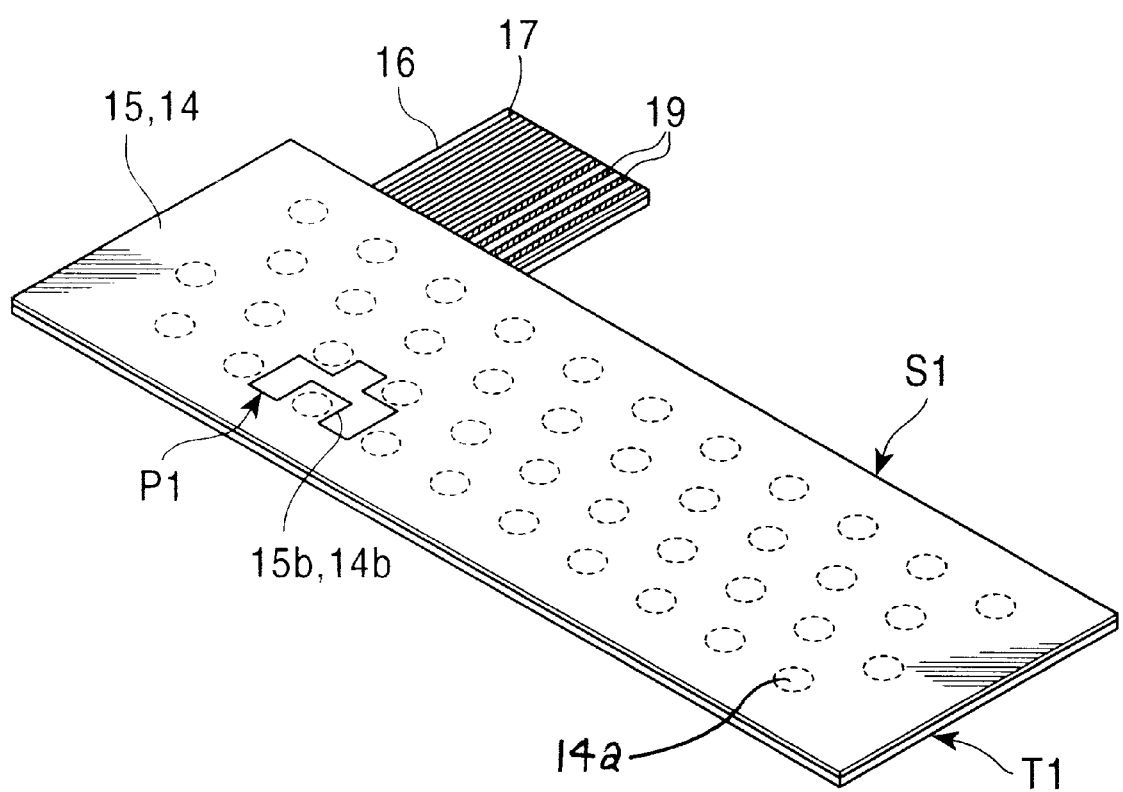
FIG. 1 is a general perspective view of a keyboard device according to the present invention.
Figure 2:
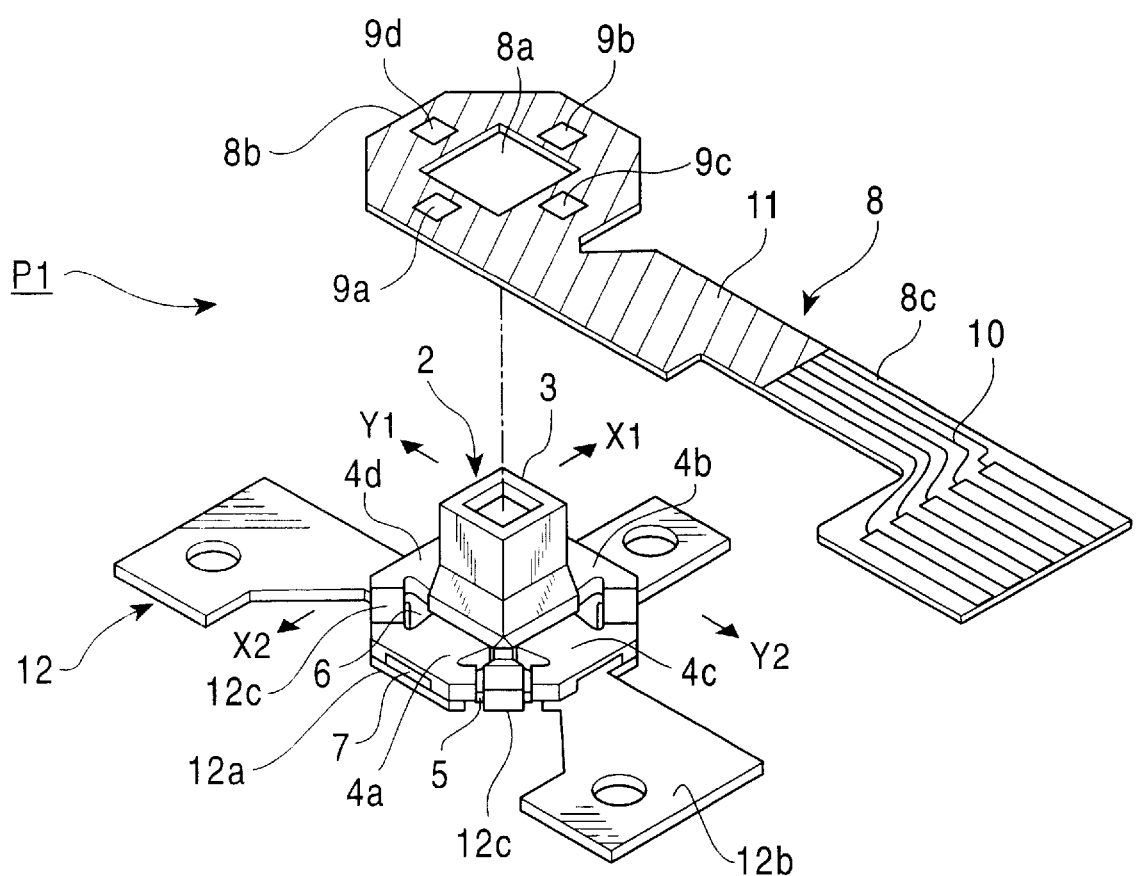
FIG. 2 is an enlarged and exploded perspective view showing the principal part of a pointing device in the keyboard device according to a first embodiment of the present invention.
Figure 3:
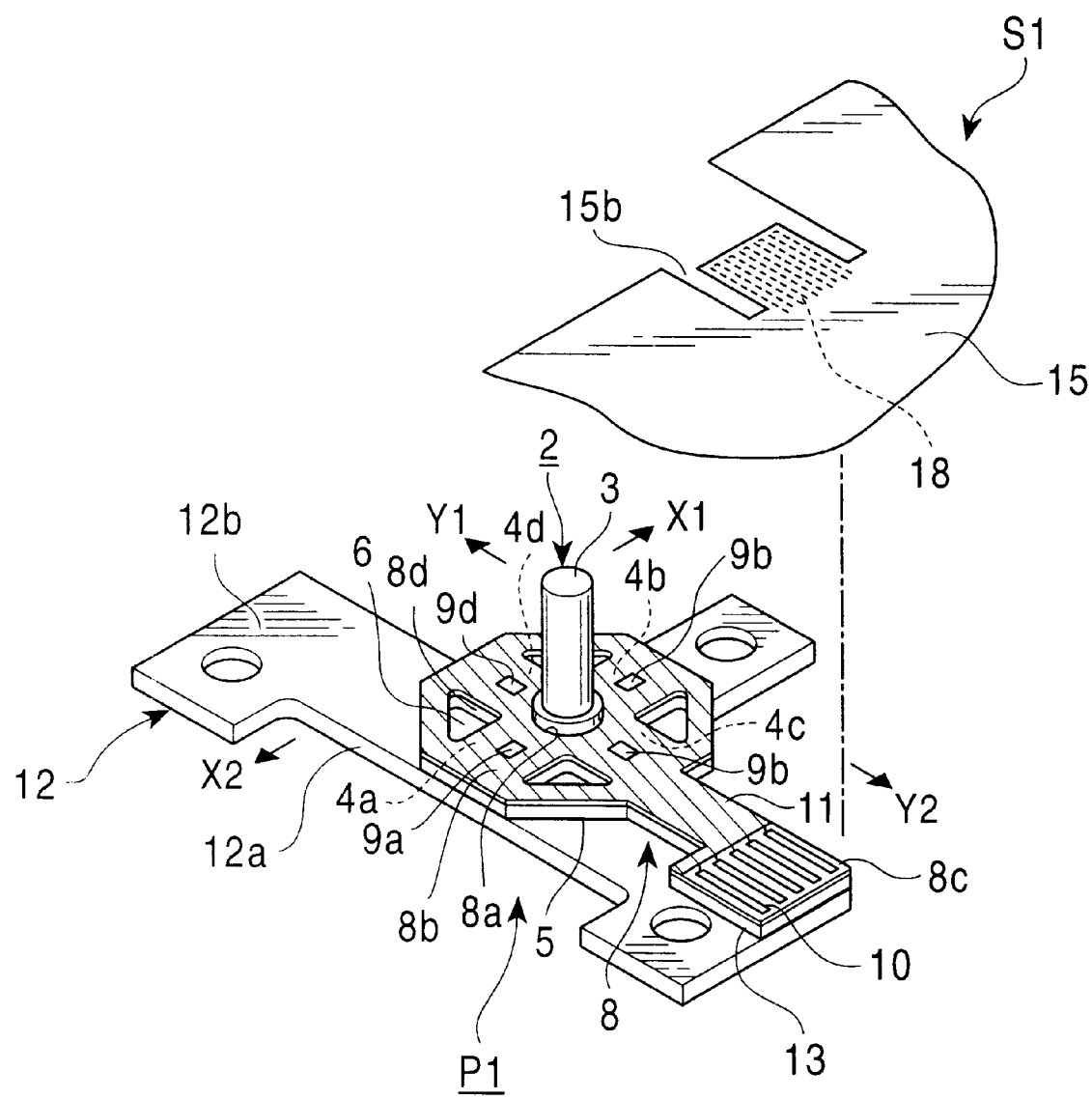
FIG. 3 is an enlarged and exploded perspective view showing the principal part of a pointing device in the device according to a second embodiment of the present invention.
Figure 4:
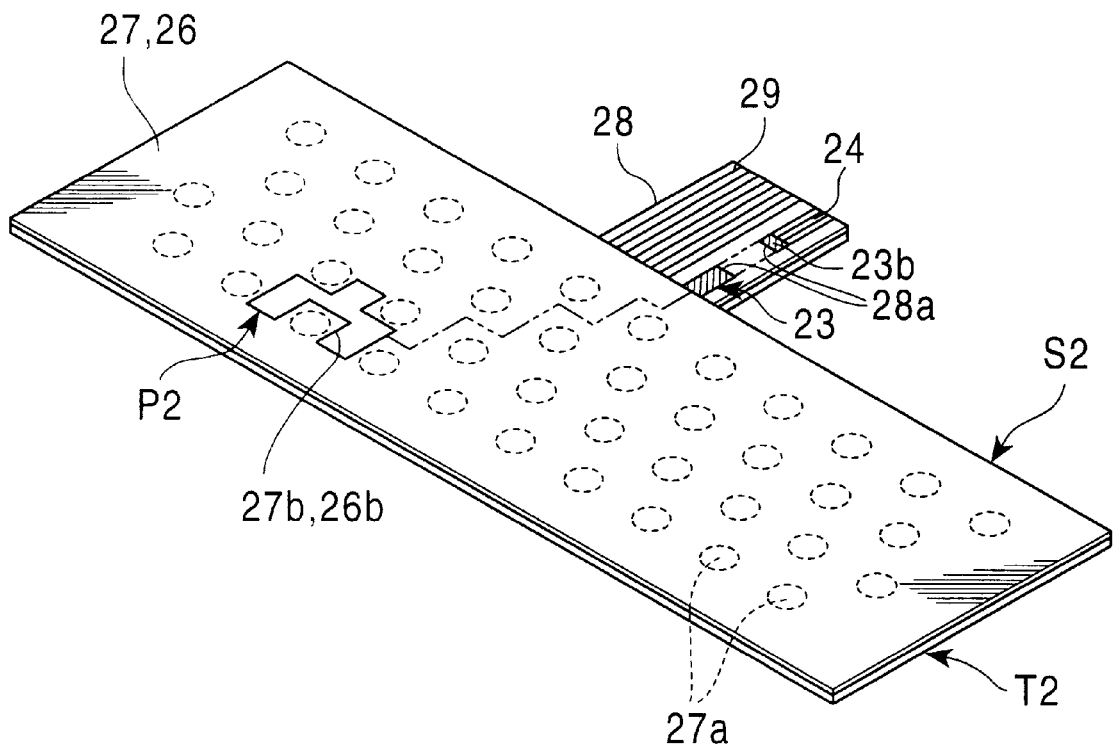
FIG. 4 is a general perspective view of a conventional keyboard device.
Figure 5:
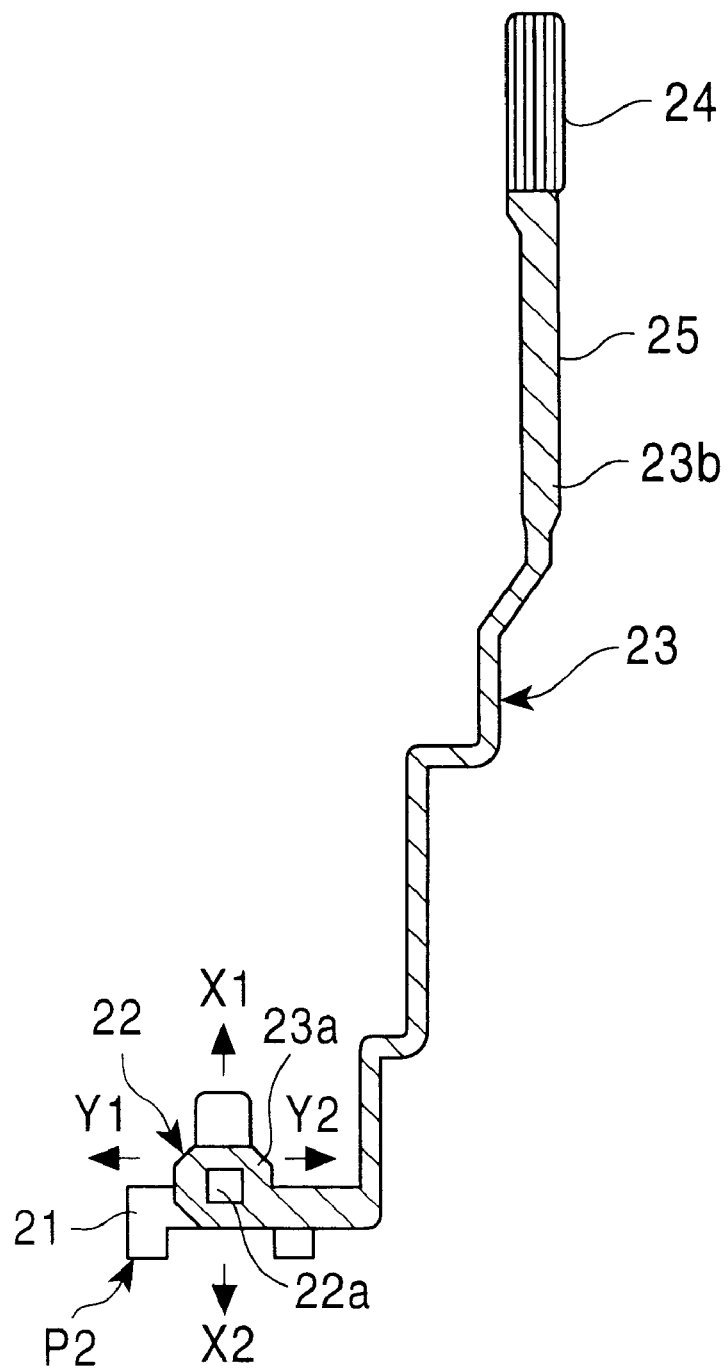
FIG. 5 is a plan view of a pointing device in the conventional keyboard device.

A keyboard device according to the present invention will be described with reference to FIGS. 1 to 3. FIG. 1 is a general perspective view of the keyboard device of the present invention, FIG. 2 is an enlarged and exploded perspective view showing the principal part of a pointing device in the keyboard device according to a first embodiment of the present invention, and FIG. 3 is an enlarged and exploded perspective view showing the principal part of a pointing device in the keyboard device according to a second embodiment of the present invention.

The keyboard device of the present invention comprises a membrane switch S1, a pointing device P1 incorporated in the membrane switch S1, and a mounting plate T1 made of metal for mounting and supporting the membrane switch S1 and the pointing device P1.

Next, the configuration of a pointing device P1 according to a first embodiment of the present invention will be described with reference to FIG. 2.

A flexible control member 2 is molded from a synthetic resin or a synthetic resin containing glass fiber (for example, modified polyphenylene ether), and comprises a prismatic operating portion 3, four beam portions 4a, 4b, 4c, and 4d connected at one end to the bottom of the operating portion 3 and radially extending from the bottom at right angles to one another in the form of a cross, four connecting portions 5 connected to the other ends of the adjoining beam portions 4a, 4b, 4c, and 4d, and four triangular holes 6 formed at the corners of the operating portion 3 and enclosed by the adjoining beam portions 4a, 4b, 4c, and 4d and the connecting portions 5 so as to separate the beam portions 4a, 4b, 4c, and 4d.

Recesses 7 are formed on the lower sides of the beam portions 4a, 4b, 4c, and 4d. Accordingly, when the control member 2 is mounted, the beam portions 4a, 4b, 4c, and 4d are floating above the mounting surface. Moreover, the control member 2 is given an octagonal outline by the beam portions 4a, 4b, 4c, and 4d and the connecting portions 5.

The operating portion 3 can be tilted in the directions of the arrows X1, X2, Y1, and Y2, as shown in FIG. 2. In response to this tilting, the beam portions 4a, 4b, 4c, and 4d are bent, and the upper sides thereof are tensioned and compressed. The holes 6 formed between the beam portions 4a, 4b, 4c, and 4d allow the beam portions to be individually bent without any influence of the adjoining beam portions when the operating portion 3 is tilted.

A flexible substrate 8 made of polyimide resin includes an octagonal annular base portion 8b having a rectangular hole 8a at the center, and a substantially short extension 8c connected to the base portion 8b.

On the upper surface of the base portion 8b, strain gauges 9a, 9b, 9c, and 9d, such as resistors, are placed in the form of a cross. On the upper surfaces of the base portion 8b and the extension 8c, connection conductors 10 are formed to be connected to the strain gauges 9a, 9b, 9c, and 9d.

While the four strain gauges 9a, 9b, 9c, and 9d are used in this embodiment, only two of the strain gauges 9a and 9c may be used.

A resist 11 (hatched area) made of an insulating material is applied to the overall upper surface of the base portion 8b and a part of the upper surface of the extension 8c so as to cover the strain gauges 9a, 9b, 9c, and 9d and a part of the connection conductors 10. A mounting member 12 formed of a flat metal plate has an octagonal receiving portion 12a at the center thereof, arm portions 12b extending from the receiving portion 12a in three directions, and four protruding pieces 12c formed at the side edges of the receiving portion 12a.

The control member 2 is placed on the receiving portion 12a, the protruding pieces 12c are folded onto the connecting portions 5, whereby the control member 2 is mounted on the mounting member 12. When the control member 2 is mounted, clearances are formed between the receiving portion 12a and the beam portions 4a, 4b, 4c, and 4d because of the presence of the recesses 7.

The flexible substrate 8 is attached to the control member 2 mounted on the mounting member 12 by passing the operating portion 3 through the hole 8a of the flexible substrate 8 and bonding the lower surface of the base portion 8b onto the beam portions 4a, 4b, 4c, and 4d with an adhesive.

When the flexible substrate 8 is attached to the control member 2, the strain gauges 9a, 9b, 9c, and 9d are respectively placed on the beam portions 4a, 4b, 4c, and 4d.

In the operation of such a pointing device P1, when the operating portion 3 is tilted in the X1-direction, the upper side of the beam portion 4a is bent to be tensioned, while the upper side of the beam portion 4b is bent to be compressed. Therefore, the resistance of the strain gauge 9a on the upper side of the beam portion 4a increases, while the resistance of the strain gauge 9b on the upper side of the beam portion 4b decreases. Furthermore, when the operating portion 3 is tilted down in the X2-direction, the upper side of the beam portion 4a is bent to be compressed, while the upper side of the beam portion 4b is bent to be tensioned. Therefore, the resistance of the strain gauge 9a on the upper side of the beam portion 4a decreases, while the resistance of the strain gauge 9b on the upper side of the beam portion 4b increases. This produces a voltage difference between the strain gauges 9a and 9b, and the cursor can be moved in the X-axis direction.

When the operating portion 3 is tilted in the Y1-direction, the upper side of the beam portion 4c is bent to be tensioned, while the upper side of the beam portion 4d is bent to be compressed. Therefore, the resistance of the strain gauge 9c on the upper side of the beam portion 4c increases, and the resistance of the strain gauge 9d on the upper side of the beam portion 4d decreases. Furthermore, when the operating portion 3 is tilted in the Y2-direction, the upper side of the beam portion 4c is bent to be compressed, while the upper side of the beam portion 4d is bent to be tensioned. Therefore, the resistance of the strain gauge 9c on the upper side of the beam portion 4c decreases, while the resistance of the strain gauge 9d on the upper side of the beam portion 4d increases. This produces a voltage difference between the strain gauges 9c and 9d, and the cursor can be moved in the Y-axis direction.

Next, description will be given of the configuration of a pointing device P1 according to a second embodiment of the present invention with reference to FIG. 3. The same components as those in the first embodiment are denoted by the same numerals.

In the pointing device P1 of the second embodiment, a flexible control member 2 is molded from a synthetic resin or a synthetic resin containing glass fiber (for example, modified polyphenylene ether), and comprises a cylindrical operating portion 3, four beam portions 4a, 4b, 4c, and 4d connected at one end to the bottom of the operating portion 3 and radially extending from the bottom at right angles to one another in the form of a cross, four connecting portions 5 connected to the other ends of the adjoining beam portions 4a, 4b, 4c, and 4d, four triangular holes 6 formed at the corners of the operating portion 3 and enclosed by the adjoining beam portions 4a, 4b, 4c, and 4d and the connecting portions 5 so as to separate the beam portions 4a, 4b, 4c, and 4d, and an extension 13 extending from the beam portion 4c.

The operating portion 3 can be tilted in the directions of the arrows X1, X2, Y1, and Y2, as shown in FIG. 3. In response to this tilting, the beam portions 4a, 4b, 4c, and 4d are bent, and the upper sides thereof are tensioned and compressed. The holes 6 formed between the beam portions 4a, 4b, 4c, and 4d allow the beam portions to be individually bent without any influence of the adjoining beam portions when the operating portion 3 is tilted. A flexible substrate 8 made of polyimide resin includes an octagonal annular base portion 8b having a rectangular hole 8a at the center, a substantially short extension 8c connected to the base portion 8b, and a plurality of triangular holes 8d.

On the upper surface of the base portion 8b, strain gauges 9a, 9b, 9c, and 9d, such as resistors, are placed in the form of a cross. On the upper surfaces of the base portion 8b and the extension 8c, connection conductors 10 are formed to be connected to the strain gauges 9a, 9b, 9c, and 9d.

While the four strain gauges 9a, 9b, 9c, and 9d are used in this embodiment, only two of the strain gauges 9a and 9c may be used.

A resist 11 (hatched area) made of an insulating material is applied to the overall upper surface of the base portion 8b and a part of the upper surface of the extension 8c so as to cover the strain gauges 9a, 9b, 9c, and 9d and a part of the connection conductors 10.

A mounting member 12 formed of a flat metal plate has a receiving portion 12a at the center thereof, and arm portions 12b extending from the receiving portion 12a in three directions.

The control member 2 is placed on the receiving portion 12a and the arm portions 12b, and is bonded to the receiving portion 12a.

The flexible substrate 8 is attached to the control member 2 bonded to the mounting member 12 by passing the operating portion 3 through the hole 8a of the flexible substrate 8, bonding the lower surface of the base portion 8b onto the beam portions 4a, 4b, 4c, and 4d, and bonding the extension 8c onto the extension 13 with an adhesive.

When the flexible substrate 8 is attached to the control member 2, the strain gauges 9a, 9b, 9c, and 9d are respectively placed on the beam portions 4a, 4b, 4c, and 4d. The connection conductors 10 at the end of the extension 8c are placed on the extension 13 and within the surface area of the control member 2 or the mounting member 12.

Such a pointing device P1 operates in a manner similar to that in the first embodiment. During operation, when the operating portion 3 is tilted in the X1-direction, the upper side of the beam portion 4a is bent to be tensioned, while the upper side of the beam portion 4b is bent to be compressed. Therefore, the resistance of the strain gauge 9a on the upper side of the beam portion 4a increases, while the resistance of the strain gauge 9b on the upper side of the beam portion 4b decreases. Furthermore, when the operating portion 3 is tilted down in the X2-direction, the upper side of the beam portion 4a is bent to be compressed, while the upper side of the beam portion 4b is bent to be tensioned. Therefore, the resistance of the strain gauge 9a on the upper side of the beam portion 4a decreases, while the resistance of the strain gauge 9b on the upper side of the beam portion 4b increases. This produces a voltage difference between the strain gauges 9a and 9b, and the cursor can be moved in the X-axis direction. When the operating portion 3 is tilted in the Y1-direction, the upper side of the beam portion 4c is bent to be tensioned, while the upper side of the beam portion 4d is bent to be compressed. Therefore, the resistance of the strain gauge 9c on the upper side of the beam portion 4c increases, and the resistance of the strain gauge 9d on the upper side of the beam portion 4d decreases. Furthermore, when the operating portion 3 is tilted in the Y2-direction, the upper side of the beam portion 4c is bent to be compressed, while the upper side of the beam portion 4d is bent to be tensioned. Therefore, the resistance of the strain gauge 9c on the upper side of the beam portion 4c decreases, while the resistance of the strain gauge 9d on the upper side of the beam portion 4d increases. This produces a voltage difference between the strain gauges 9c and 9d, and the cursor can be moved in the Y-axis direction.

The membrane switch S1 shown in FIG. 1 is formed of a polyester resin film, and includes a rectangular lower film substrate 14, a rectangular upper film substrate 15 placed at a predetermined distance from the lower film substrate 14 with a spacer (not shown) therebetween, and a rectangular leader portion 16 formed integrally with the lower film substrate 14 so as to protrude therefrom.

The lower and upper film substrates 14 and 15 are formed by folding a single film in two.

A plurality of contact portions (not shown) and a layout conductor (not shown) connected to the contact portions are formed on the opposing surfaces of the lower and upper film substrates 14 and 15. The layout conductor is connected to switch terminal portions 17 formed in the leader portion 16 so as to electrically connect the membrane switch S1 to the outside.

Lead-out conductors 18 are also formed on the opposing surfaces of the lower and upper film substrates 14 and 15. These lead-out conductors 18 are connected to pointing device terminal portions 19 disposed in parallel with the switch terminal portions 17 in the leader portion 16.

When a pressure portion 15a of the upper film substrate 15 is pressed, the upper film substrate 15 is bent and a contact portion thereof contacts a corresponding contact portion of the lower film substrate 14, whereby a signal is led out to the switch terminal portions 17 via the layout conductor.

The lower and upper film substrates 14 and 15 have holes 14b and 15b for holding the pointing device P1 therein.

The lead-out conductors 18 extend to the adjacency of the hole 15b (see FIG. 3).

The pointing device P1 is placed inside the holes 14b and 15b so that the extension 8c of the flexible substrate 8 is located between the lower film substrate 14 and the upper film substrate 15, and the connection conductors 10 at the end of the extension 8 are fixedly connected to the lead-out conductors 18 on the upper film substrate 15 with a conductive adhesive or the like.

Then, the connection conductors 10 are connected to the lead-out conductors 18 adjacent to the pointing device P1 in the first embodiment, and the connection conductors 10 are connected to the lead-out conductors 18 within the area of the pointing device P1 in the second embodiment.

The membrane switch S1 and the pointing device P1 thus combined are placed and fixed on the mounting plate T1 by an appropriate means, such as caulking or bonding, thereby constructing the keyboard device.

The switch terminal portions 17 and the pointing device terminal portions 19 in such a keyboard device are connected to an electronic device, such as a computer so that signals from the membranes switch S1 and the pointing device P1 are input to the electronic device.

While the strain gauges 9a to 9d are provided in the flexible substrate 8 in the above embodiments, they may be provided in the beam portions 4a to 4d of the control member 2.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A keyboard device having a pointing device, comprising:

a membrane switch having two upper and lower film substrates, made of polyester resin, with a plurality of contact portions, and a leader portion formed integrally with said film substrates; and a pointing device incorporated in the area of said membrane switch and having a strain gauge and a flexible substrate, made of polyimide resin, for electrically connecting said strain gauge to the outside, wherein said leader portion has a switch terminal portion and a pointing device terminal portion, said film substrates are provided with a lead-out conductor to be led out to said pointing device terminal portion, said flexible substrate is provided with a connection conductor, and said connection conductor is connected to said lead-out with a conductive adhesive conductor adjacent to said pointing device;

wherein said pointing device includes a control member attached to said base portion of said flexible substrate and for operating said strain gauge, and a mounting member formed of a metal plate for mounting said control member thereon, and said connection conductor is connected to said lead-out conductor within the surface area of said control member or-said mounting member; and wherein said lead-out conductors are formed on the lower surface of the upper film substrate, and the connection conductors are formed on the upper surface of the base portion.

\* \* \* \* \*

UNITED STATES PATENT AND TRADEMARK OFFICE
CERTIFICATE OF CORRECTION

PATENT NO.    : 6,512,510 B1  
DATED         : January 28, 2003  
INVENTOR(S)   : Ryoichi Maeda It is certified that error appears in the above-identified patent and that said Letters Patent is hereby corrected as shown below:

<u>Column 8,</u>
Line 42, delete "or-said" and substitute -- or said -- in its place.

Signed and Sealed this

Sixth Day of May, 2003

JAMES E. ROGAN
*Director of the United States Patent and Trademark Office*